(12) United States Patent
Yamazaki et al.

(10) Patent No.: US 10,788,345 B2
(45) Date of Patent: Sep. 29, 2020

(54) THERMAL FLOWMETER

(71) Applicant: AZBIL CORPORATION, Chiyoda-ku (JP)

(72) Inventors: Yoshio Yamazaki, Chiyoda-ku (JP); Yasuhiko Oda, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 206 days.

(21) Appl. No.: 16/043,195

(22) Filed: Jul. 24, 2018

(65) Prior Publication Data

US 2019/0033108 A1  Jan. 31, 2019

(30) Foreign Application Priority Data

Jul. 31, 2017 (JP) .................................. 2017-147620

(51) Int. Cl.
*G01F 1/684* (2006.01)
*G01F 15/14* (2006.01)

(52) U.S. Cl.
CPC ............ *G01F 1/6847* (2013.01); *G01F 15/14* (2013.01)

(58) Field of Classification Search
None
See application file for complete search history.

(56) References Cited

U.S. PATENT DOCUMENTS 8,695,403 B2 * 4/2014 Pernel .................... G01G 3/165
                                                          73/24.06
2016/0245682 A1 * 8/2016 Igarashi ................. G01F 15/14

FOREIGN PATENT DOCUMENTS

CN      105650371 A    6/2016
EP      3 059 558 A1   8/2016
JP      2016-156650    9/2016

OTHER PUBLICATIONS

Combined Chinese Office Action and Search Report dated Jan. 6, 2020 in Chinese Patent Application No. 201810804332.3 (with English translation of categories of cited documents), 7 pages.

* cited by examiner

*Primary Examiner* — Daniel S Larkin
*Assistant Examiner* — Anthony W Megna Fuentes
(74) *Attorney, Agent, or Firm* — Oblon, McClelland, Maier & Neustadt, L.L.P.

(57) ABSTRACT

A thermal flowmeter includes a casing, a ferrule, a measuring tube penetrating through the ferrule, a sensor for flow rate detection, a joint shaft movably supported by end portions of the casing, one end portion of the joint shaft being connected to the measuring tube and the ferrule with a through hole of the joint shaft and a hollow portion of the measuring tube communicating with each other, the other end portion of the joint shaft sticking out of the casing, and a screw thread-fitted to each of the end portions of the casing, and including a pressing portion pressing the joint shaft into an inside of the casing. A seal structure includes a first tapered surface formed on the ferrule and a second tapered surface formed on the joint shaft and fitting the first tapered surface, and is provided between the ferrule and the joint shaft.

5 Claims, 6 Drawing Sheets

THERMAL FLOWMETER

CROSS-REFERENCE TO RELATED APPLICATIONS

The present application is based on and claims priority to Japanese Application No. 2017-147620, filed Jul. 31, 2017, the entire contents of which are incorporated herein by reference.

BACKGROUND

1. Field of the Disclosure

The present disclosure relates to a thermal flowmeter that includes a measuring tube in which a fluid flows, and a sensor for detecting a flow rate having a heating element and provided in the measuring tube.

2. Description of the Related Art

Thermal flowmeters thus far developed include, for example, one configured as shown in FIG. 6, and one described in Japanese Unexamined Patent Application Publication No. 2016-156650. A thermal flowmeter 1 shown in FIG. 6 includes a box-shaped casing 2, and a measuring tube 3, a not-illustrated printed circuit board, and so forth, located inside the casing 2. The measuring tube 3 is formed of a hard tube material such as a glass tube. The measuring tube 3 includes a recess 4 formed at a central portion in the longitudinal direction, where a not-illustrated sensor for flow rate detection is to be mounted.

The end portions of the measuring tube 3 are each supported by the casing 2 via a ferrule 5 and a joint shaft 6. The ferrule 5 and the joint shaft 6 are formed of a fluororesin. The ferrule 5 is formed in a cylindrical shape, has a first tapered surface 7 on one end portion, and is pressed against the joint shaft 6 by a nut 8 screw-fitted on one end portion of the joint shaft 6. The first tapered surface 7 is formed such that the outer diameter of the ferrule 5 gradually increases from the one end portion toward the other end portion of the ferrule 5. The measuring tube 3 is fitted in a hollow portion of the ferrule 5.

The joint shafts 6 are arranged so as to penetrate through side walls 2a and 2b of the casing 2, and fixed to the side walls 2a and 2b. A through hole 9 is formed along the axial center of the joint shaft 6. The through hole 9 constitutes a fluid path in collaboration with a hollow portion 3a of the measuring tube 3.

The joint shaft 6 includes a second tapered surface 10 formed on the one end portion located inside the casing 2 so as to fit to the first tapered surface 7 of the ferrule 5. When the nut 8 is screwed onto the joint shaft 6, the first tapered surface 7 is pressed against the second tapered surface 10, so that the first and second tapered surfaces 7 and 10 are made to closely contact each other, and the one end portion of the ferrule 5 is contracted so as to closely contact the measuring tube 3. Accordingly, the interface between the measuring tube 3 and the joint shaft 6 is sealed to prevent the fluid from leaking out of the fluid path.

To attach the measuring tube 3 to the joint shaft 6, first the ferrule 5 and the nut 8 are attached to each of the end portions of the measuring tube 3, and the measuring tube 3 with the ferrule 5 and the nut 8 is inserted in the casing 2, after which each of the end portions of the measuring tube 3 and the ferrule 5 are connected to the one end portion of the joint shaft 6. Then, the nut 8 is screwed onto the joint shaft 6, so that the first tapered surface 7 of the ferrule 5 is pressed against the second tapered surface 10 of the joint shaft 6, the measuring tube 3 is fixed to the joint shaft 6, and the interface therebetween is sealed.

The thermal flowmeter disclosed in the above-cited document includes a casing, and an assembly including a sensor and a measuring tube. The casing includes a through hole formed in each of one end portion and the other end portion. The assembly includes the measuring tube, a ferrule attached to each of the end portions of the measuring tube in the same way as in the thermal flowmeter shown in FIG. 6, a nut, a joint shaft, and the like. The assembly is inserted in a through hole in one end portion and a through hole in the other end portion of the casing, and fixed thereto.

With the thermal flowmeter shown in FIG. 6, the nut 8 has to be fastened inside the casing 2 to attach the measuring tube 3 to the joint shaft 6, and therefore the work efficiency for attaching the measuring tube 3 is low. In addition, to ensure the sealing effect of the interface between the measuring tube 3 and the joint shaft 6, the first and second tapered surfaces 7 and 10 have to be formed with a large area, which leads to an increase in the outer diameter of the ferrule 5 and the joint shaft 6, as well as in the outer size of the nut 8. Accordingly, the casing 2 also has to be formed in such a size that allows the large nut 8 to be accommodated therein, and that allows the fastening of the nut 8 onto the joint shaft 6 to be performed inside the casing 2. Consequently, the size of the casing 2 has to be increased.

The mentioned drawbacks can be minimized to a certain extent by combining the measuring tube and the joint shaft into a single assembly outside the casing, as proposed in the above-cited document. With such a remedy, however, drawbacks still remain that originate from the ferrule being formed of a resin material.

To be more detailed, the ferrule is prone to be plastically deformed because of being retained with a stress generated therein, which is a phenomenon known as cold flow. When the ferrule suffers the cold flow, the pressing force applied to the sealed surface is reduced, and the sealing effect is impaired. To maintain the sealing effect at a satisfactory level, the nut has to be periodically retightened. With the thermal flowmeter shown in FIG. 6 or according to the above-cited document, since the nut is accommodated inside the casing, the nut is unable to be retightened unless the casing is disassembled. In the case where the casing is unable to be disassembled, the retightening is impracticable.

Further, with the thermal flowmeter shown in FIG. 6 or according to the above-cited document, the measuring tube is unable to be restricted from rotating with respect to the casing in the process of fixing the measuring tube to the casing. Accordingly, in the thermal flowmeter 1 shown in FIG. 6, the rotational force for screwing the nut 8 onto the joint shaft 6 is transmitted to the measuring tube 3 via the ferrule 5, and the measuring tube 3 rotates so as to follow up the nut 8. When the measuring tube 3 rotates as above, the position of the sensor is changed, and therefore the position for detecting the flow rate of the fluid in the measuring tube 3 varies in each of the products. Consequently, it is difficult to manufacture the thermal flowmeter shown in FIG. 6 or according to the above-cited document at a stabilized quality level.

SUMMARY

Accordingly, the present disclosure provides a thermal flowmeter including a casing of a reduced size, and configured to improve work efficiency in mounting a measuring tube and also to compensate a pressing force applied to a sealed surface. The present disclosure also provides a thermal flowmeter that prevents a rotational force from being transmitted to the measuring tube in the process of mounting the measuring tube in the casing.

In an aspect, the present disclosure provides a thermal flowmeter including a casing formed in a box shape, a ferrule formed in a cylindrical shape and supported by one end portion and the other end portion of the casing along an imaginary axial line passing through the one end portion and the other end portion, a measuring tube accommodated in the casing, and penetrating through the ferrule and fitted in a hollow portion of the ferrule at each of end portions, a sensor for detecting a flow rate having a heating element and provided in the measuring tube, a joint shaft including a through hole extending along the axial line, and supported by the one end portion and the other end portion of the casing to be movable along the axial line, one end portion of the joint shaft being connected to the measuring tube and the ferrule with the through hole and a hollow portion of the measuring tube communicating with each other, the other end portion of the joint shaft sticking out of the casing, and a screw thread-fitted to each of the one end portion and the other end portion of the casing to move along the axial line, and including a pressing portion pressing the joint shaft into an inside of the casing when the screw is fastened. A seal structure includes a first tapered surface formed on the ferrule, and a second tapered surface formed on the joint shaft in a shape that allows the second tapered surface to fit the first tapered surface, and is provided on an interface between the ferrule and the joint shaft.

The mentioned thermal flowmeter may further include a spring that biases the joint shaft toward an inside of the casing, the spring being located between the joint shaft and the pressing portion of the screw.

In the foregoing thermal flowmeter, a portion of the casing supporting the joint shaft may include a first flat surface extending in a direction parallel to the axial line, and the joint shaft may include a second flat surface disposed in sliding contact with the first flat surface.

To attach the measuring tube to the casing in the foregoing thermal flowmeter, first the end portions of the measuring tube are supported by one end portion and the other end portion of the casing via the ferrules. Then the joint shafts are each supported by the one end portion or the other end portion of the casing, and connected to the measuring tube and the ferrule. The screw is then thread-fitted to the casing, and presses the joint shaft into the inside of the casing with the pressing portion of the screw. By the joint shaft being thus pressed, the first tapered surface and the second tapered surface are made to closely contact each other, and one of the ferrule and the joint shaft is contracted and closely abuts against the measuring tube. Consequently, the interface between the measuring tube and the joint shaft can be sealed.

In the mentioned thermal flowmeter, a nut for attaching the measuring tube is not provided in the casing, which eliminates the need to secure a space for turning the nut inside the casing. Therefore, the casing of the thermal flowmeter can be formed in a reduced size.

In addition, in the mentioned thermal flowmeter, the screw to be turned to attach the measuring tube is provided outside the casing. Therefore, the thermal flowmeter facilitates the mounting work of the measuring tube, compared with the existing thermal flowmeter shown in FIG. 6.

Further, with the foregoing thermal flowmeter, the pressing force applied to the sealed surface can be compensated by retightening the screw when the component constituting the seal structure suffers a cold flow. Therefore, the sealed portion can be retightened without the need to disassemble the casing.

Consequently, the thermal flowmeter allows reduction in size of the casing, and yet improves the work efficiency in mounting the measuring tube. Further, the thermal flowmeter can compensate the pressing force applied to the sealed surface.

DETAILED DESCRIPTION

Hereafter, an embodiment of a thermal flowmeter according to the present disclosure will be described in detail with reference to FIG. 1 to FIG. 5.

Figure 1:
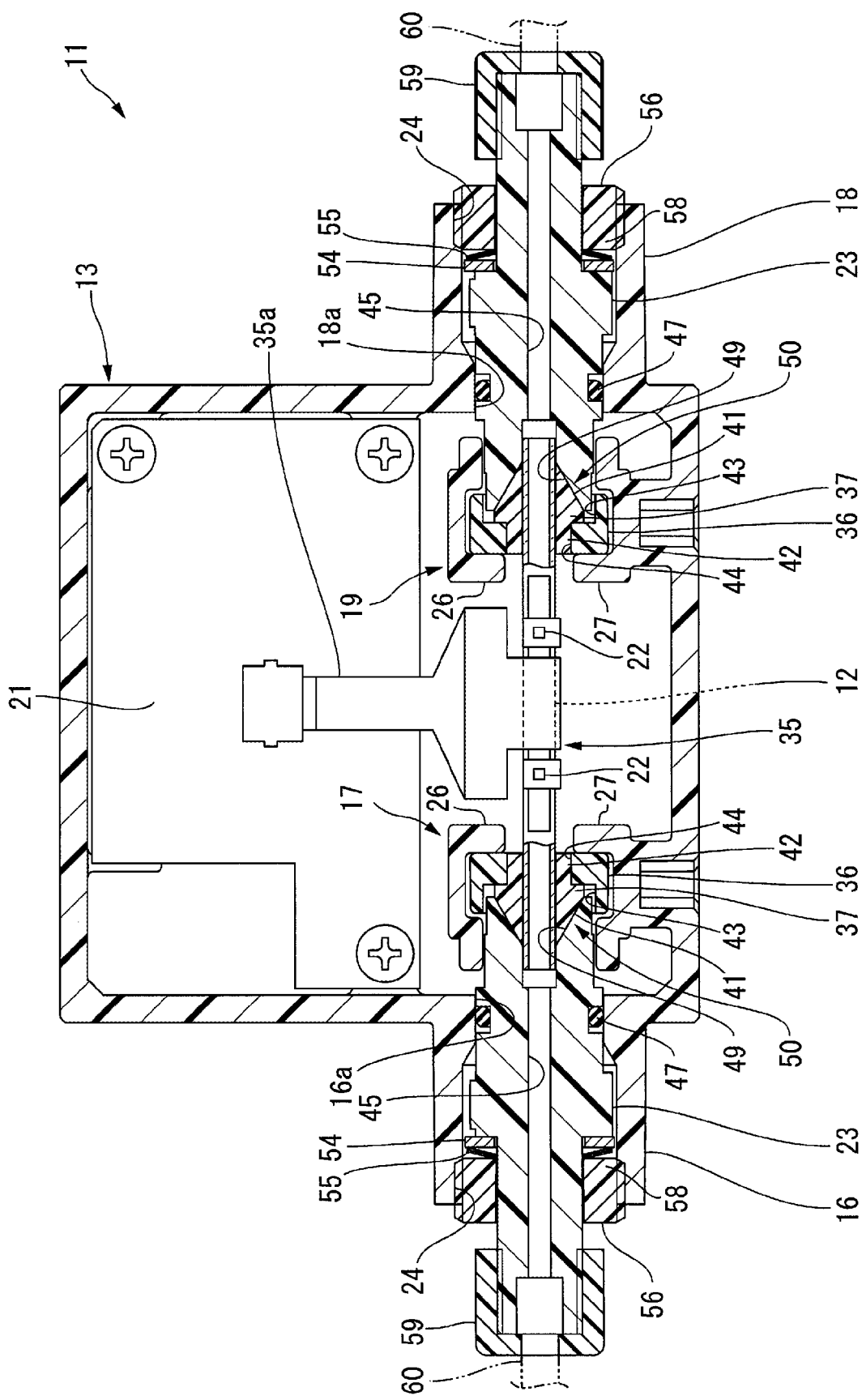
FIG. 1 is a cross-sectional view showing a thermal flowmeter according to the present disclosure.

The thermal flowmeter 11 shown in FIG. 1 is configured to detect the flow rate of a fluid flowing in a measuring tube 12 located in a lower central portion in FIG. 1. The thermal flowmeter 11 includes a casing 13 formed in a box shape, in which the measuring tube 12 and other components are mounted.

Figure 2:
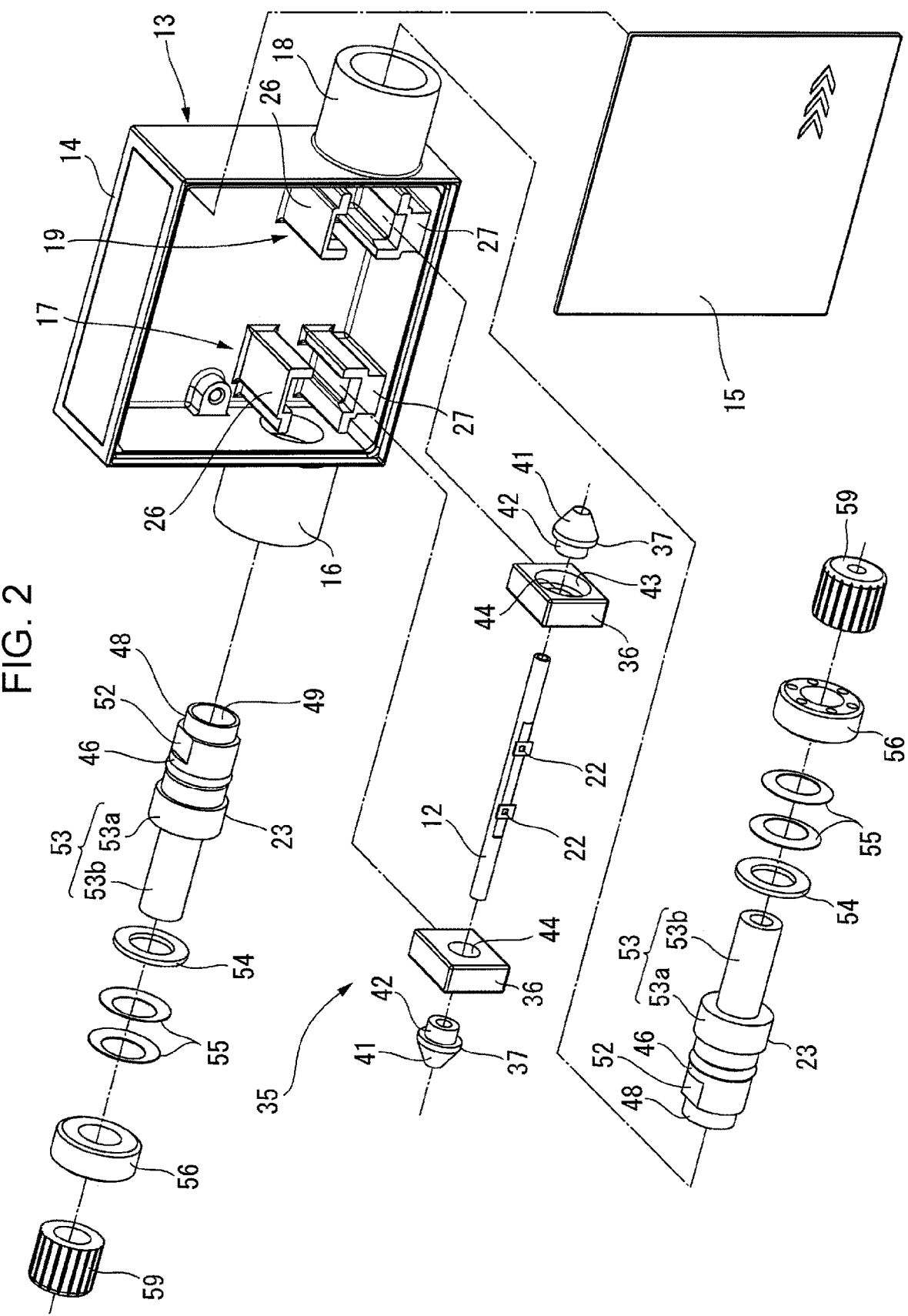
FIG. 2 is an exploded perspective view of the thermal flowmeter according to the present disclosure.
Figure 3:
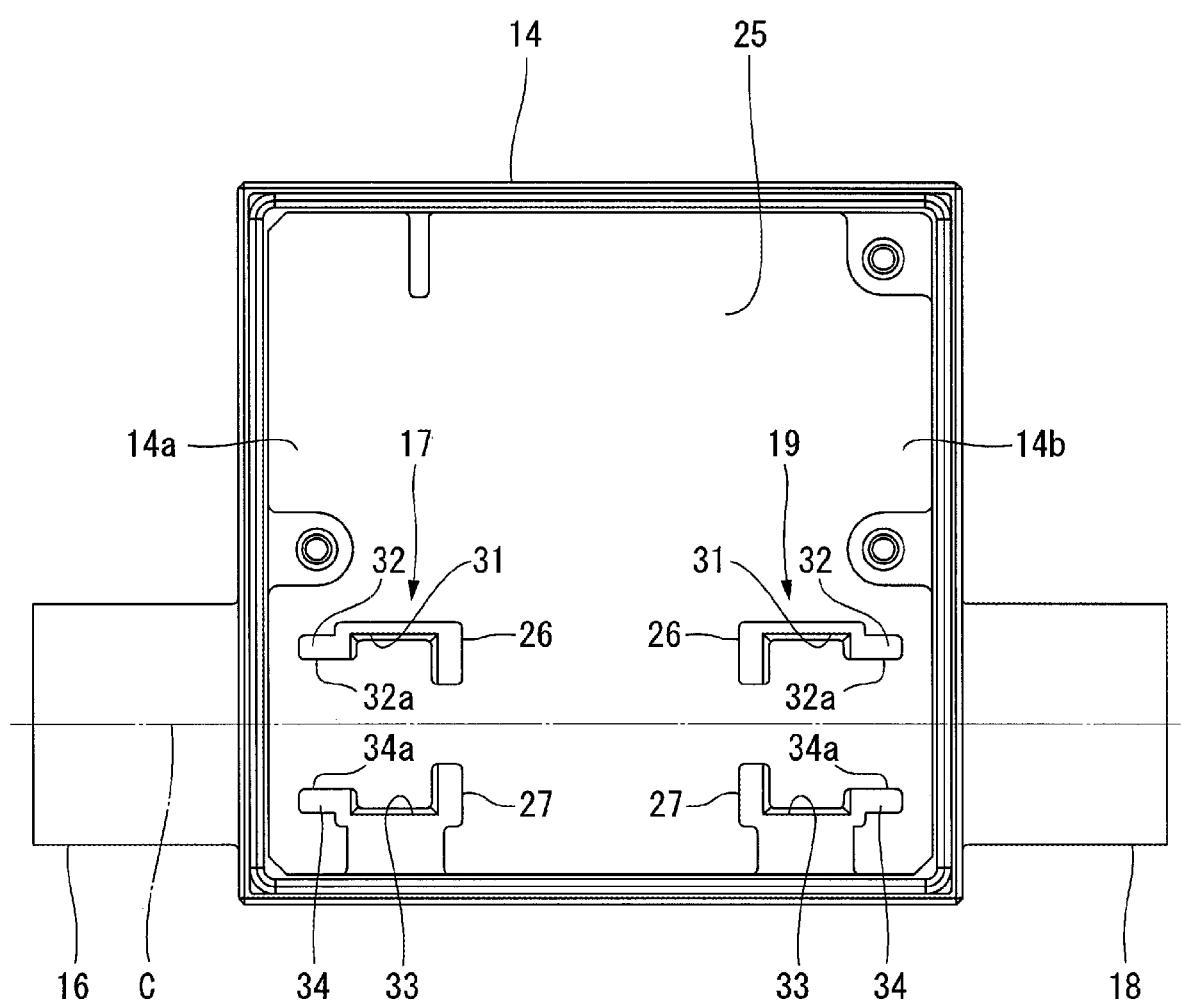
FIG. 3 is a front view showing a part of a casing.

The casing 13 includes, as shown in FIG. 2 and FIG. 3, a main body 14 having a bottomed rectangular cylindrical shape, a lid 15 covering the opening of the main body 14, an upstream cylinder 16 and an upstream support wall 17 provided on one end portion 14a (on the left in FIG. 1) of the main body 14, and a downstream cylinder 18 and a downstream support wall 19 provided on the other end portion 14b of the main body 14. The main body 14, the upstream cylinder 16 and the upstream support wall 17, and the downstream cylinder 18 and the downstream support wall 19 are formed as a unified body by integral molding. The material constituting the casing 13, the lid 15 inclusive, is a hard plastic having high mechanical strength. Such a plastic can be exemplified by a polyphenylene sulfide (PPS) resin. In this embodiment, the one end portion 14a of the main body 14 and the upstream cylinder 16 correspond to the "one end portion of the casing" in the present disclosure, and the other end portion 14b of the main body 14 and the downstream cylinder 18 correspond to "the other end portion of the casing" in the present disclosure.

A printed circuit board 21 is located inside the main body 14 as shown in FIG. 1. Though not illustrated, a flow detection circuit, a communication circuit, a power circuit, and so forth are mounted on the printed circuit board 21. The flow detection circuit is connected to a flow detection sensor 22 provided on the measuring tube 12 to detect the flow rate of the fluid in the measuring tube 12 on the basis of the detection value from the sensor 22.

The communication circuit is configured to transmit a signal indicating the data of the flow rate detected by the flow detection circuit to a not-illustrated external apparatus.

The power circuit is connected to a not-illustrated external power source to supply power to various electronic parts of the thermal flowmeter 11.

The lid 15 is formed in a plate shape, and joined to the edge of the opening of the main body 14. The main body 14 and the lid 15 are joined to each other so as to tightly close the opening of the main body 14 with the lid 15.

The upstream cylinder 16 and the downstream cylinder 18 are each formed in a cylindrical shape, and stick out from the main body 14 with an axial line coinciding with an imaginary axial line C passing the one end portion 14a and the other end portion 14b of the main body 14, as shown in FIG. 3. A joint shaft 23 to be subsequently described is movably inserted in each of the upstream cylinder 16 and the downstream cylinder 18 as shown in FIG. 1.

The space inside the main body 14 communicates with the outside of the casing 13 via a hollow portion of each of the upstream cylinder 16 and the downstream cylinder 18 when the joint shaft 23 in not inserted in each of the upstream cylinder 16 and the downstream cylinder 18.

Figure 4:
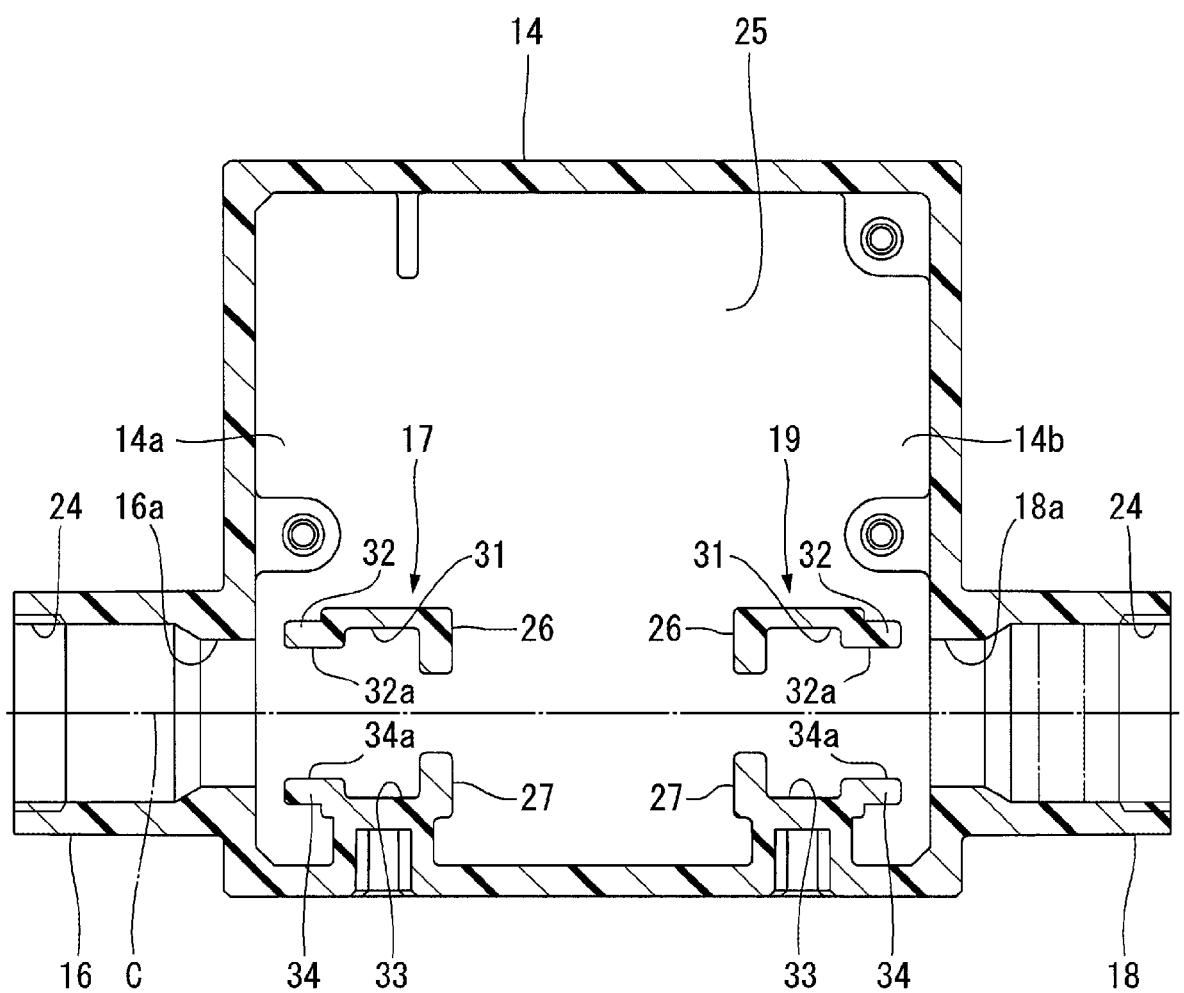
FIG. 4 is a cross-sectional view showing a part of the casing.

A female thread 24 is formed on an end portion of the inner circumferential surface of each of the upstream cylinder 16 and the downstream cylinder 18 on the opposite side of the main body 14, as shown in FIG. 4.

The upstream support wall 17 and the downstream support wall 19 are, as shown in FIG. 3, each constituted of a first wall 26 and a second wall 27 projecting from a bottom wall 25 of the main body 14 toward the opening thereof. The first wall 26 and the second wall 27 are symmetrically located on one side and the other with respect to the axial line C. The first wall 26 includes a recessed groove 31 and a flat plate 32 aligned in the direction parallel to the axial line C. The second wall 27 includes a recessed groove 33 and a flat plate 34 aligned in the direction parallel to the axial line C.

The recessed grooves 31 and 33 are located more closely to the center of the main body 14 than the flat plates 32 and 34, respectively, and each vertically extend from the bottom wall 25 of the main body 14 (orthogonally to the sheet of FIG. 3) with a cross-sectional shape open toward the axial line C. In each of the recessed grooves 31 and 33, a ferrule holder 36 of a sensor package 35 to be subsequently described is fitted as shown in FIG. 1.

The flat plate 32 of the first wall 26 includes a flat surface 32a opposed to the flat plate 34 of the second wall 27, as shown in FIG. 3. The flat plate 34 of the second wall 27 includes a flat surface 34a opposed to the flat plate 32 of the first wall 26. The flat surfaces 32a and 34a each extend in the direction orthogonal to the inner bottom face of the main body 14, and in the direction parallel to the axial line C. In this embodiment, the flat surfaces 32a and 34a correspond to the "first flat surface" in the present disclosure.

The sensor package 35 is formed into one assembly as shown in FIG. 2 from the measuring tube 12, a ferrule 37 and the holder 36 attached to each of the end portions of the measuring tube 12, and a sensor wiring board 35a (see FIG. 1) connected to the measuring tube 12 (sensor 22). The assembly process of the sensor package 35 will be subsequently described.

The measuring tube 12 is formed of a glass tube having high corrosion resistance and high thermal conductivity.

The sensor 22 for flow rate detection is fixed to the central portion of the measuring tube 12 in the longitudinal direction. The sensor 22 includes a heating element and a temperature sensor though not illustrated, and is connected to the sensor wiring board 35a.

The ferrule 37 is formed of a fluororesin in a cylindrical shape. The hollow portion of the ferrule 37 is formed for the measuring tube 12 to be fitted therein. The ferrule 37 includes, as shown in FIG. 1, a first tapered surface 41 formed on the outer circumferential portion, and a cylindrical portion 42. The first tapered surface 41 is formed so as to gradually increase the outer diameter of the ferrule 37 from one end portion toward the other end portion thereof. The cylindrical portion 42 is located on the side of the other end portion of the ferrule 37, and smaller in diameter than the portion of the first tapered surface 41 having the largest diameter. The ferrule 37 is attached to each of the end portions of the measuring tube 12 with the first tapered surface 41 located on the side of the extremity of the measuring tube 12.

The holder 36 is formed in a rectangular block shape, and includes a larger hole 43 and a smaller hole 44. In this embodiment, the holder 36 is formed of the same material as that of the casing 13. The holder 36 has an outer shape that allows the holder 36 to fit in each of the recessed grooves 31 and 33 of the second walls 26 and 27 of the casing 13. One end portion of the holder 36 is fitted in the recessed groove 31 of the first wall 26, and the other end portion is fitted in the recessed groove 33 of the second wall 27. To fit the holder 36 in the recessed grooves 31 and 33, the holder 36 is inserted into the recessed grooves 31 and 33 from the side of the distal end portion of each of the upstream support wall 17 and the downstream support wall 19, and made to slide toward the bottom wall 25 of the main body 14. When the holder 36 is fitted in the recessed grooves 31 and 33, the sensor package 35 is supported by the first and second walls 26 and 27.

The larger hole 43 and the smaller hole 44 of the holder 36 are located such that the respective axial lines coincide with the axial line C, which crosses the holder 36 when the holder 36 is supported by the first and second walls 26 and 27. The larger hole 43 and the smaller hole 44 are both circular. The diameter of the larger hole 43 is larger than the outer diameter of the ferrule 37. In this embodiment, the larger hole 43 has a size that allows one end portion of the joint shaft 23 to be subsequently described to be movably fitted.

The smaller hole 44 of the holder 36 is formed for the cylindrical portion 42 of the ferrule 37 to be fitted therein.

The sensor package 35 is attached to the casing 13 with the measuring tube 12 and the ferrule 37 located at predetermined mounting positions by turning the measuring tube 12 and the ferrule 37 with respect to the holder 36. The mounting position is set so as to allow the sensor wiring board 35a to be connected to the circuit board in the casing 13. To mount the sensor package 35 in the casing 13, the holder 36 is fitted in the recessed grooves 31 and 33 of the first and second walls 26 and 27 as described above. When the sensor package 35 is mounted in the casing 13, the measuring tube 12 and the ferrule 37 are accommodated inside the casing 13 with the axial lines coinciding with the axial line C.

As shown in FIG. 1, the joint shaft 23 is connected to each of the end portions of the sensor package 35 mounted in the casing 13.

Figure 5:
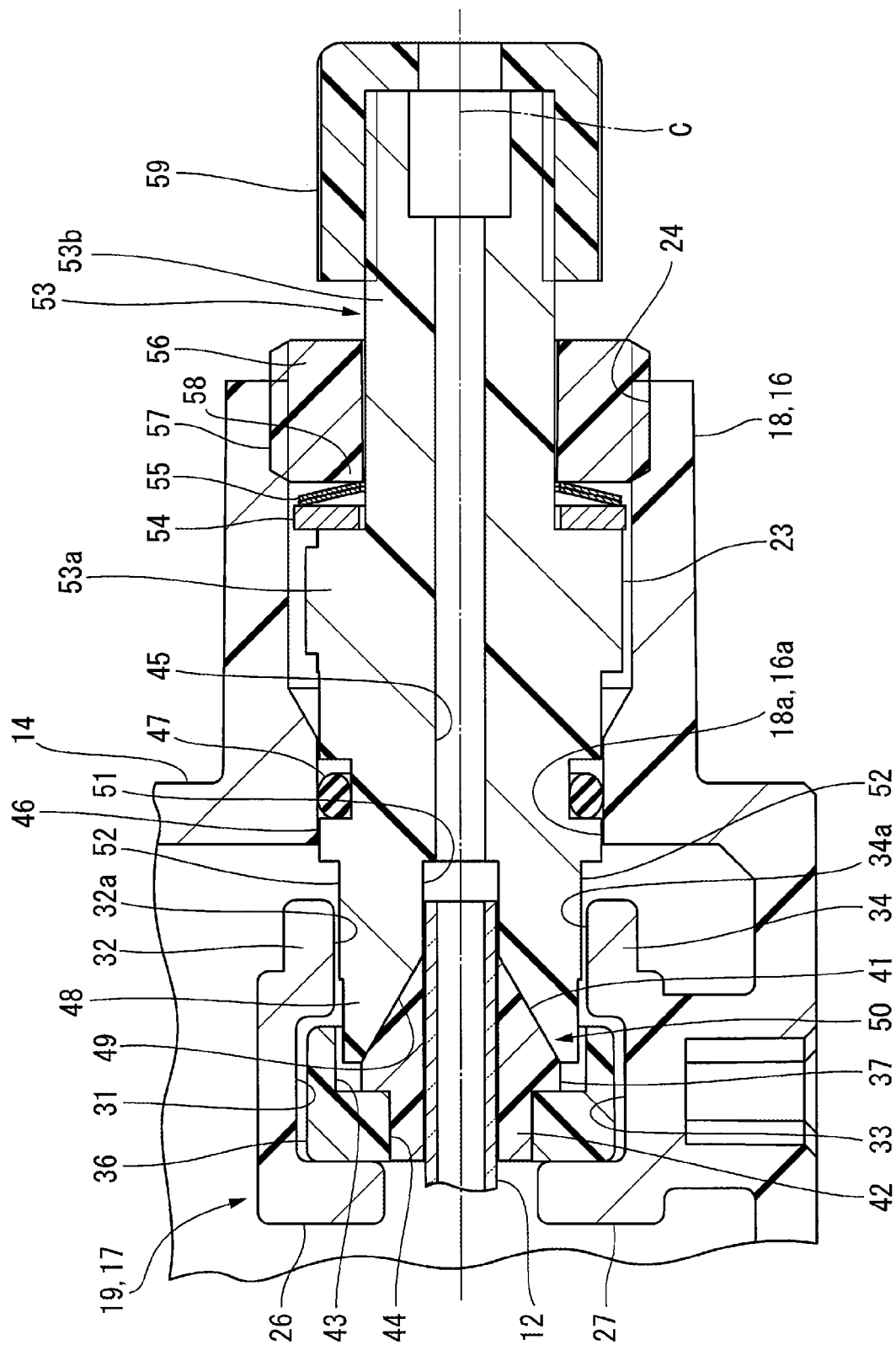
FIG. 5 is an enlarged cross-sectional view showing an essential part of the thermal flowmeter.

The joint shaft 23 is formed of a fluororesin in a cylindrical shape, and supported by one end portion and the other end portion of the casing 13 to be movable along the axial line C, as will be subsequently described in further detail. The joint shaft 23 is perforated with a through hole 45 located around the central axis and extending along the axial line C, as shown in FIG. 1 and FIG. 5.

The joint shaft 23 includes a fitting portion 46 formed in the central portion in the longitudinal direction. The fitting portion 46 is movably fitted in each of inner circumferential surfaces 16a and 18b of the upstream cylinder 16 and the downstream cylinder 18 located at the joint portion with the main body 14 of the casing 13. An O-ring 47 is provided on the fitting portion 46 to seal between the joint shaft 23 and the casing 13.

One end portion 48 of the joint shaft 23 located further inside than the fitting portion 46 in the casing 13 includes three functional portions.

A first functional portion includes a second tapered surface 49 formed in the one end portion 48 of the joint shaft 23. The second tapered surface 49 is located with the axial line coinciding with the axial line C, and formed in a shape that allows the second tapered surface 49 to fit the first tapered surface 41 of the ferrule 37, in other words, so as to gradually decrease the inner diameter from an extremity of the joint shaft 23 toward the other. The second tapered surface 49 and the first tapered surface 41 of the ferrule 37 constitute a seal structure 50 provided on the interface between the ferrule 37 and the joint shaft 23.

The one end portion 48 of the joint shaft 23 is fitted in the ferrule 37 with the distal side inserted in the larger hole 43 of the holder 36. The larger hole 43 of the holder 36 is formed in a size that allows the one end portion of the joint shaft 23 to be movably fitted.

The second functional portion includes a circular recess 51, in which the extremity of the measuring tube 12 is fitted. The circular recess 51 is formed around the central axis of the joint shaft 23, and connects the portion of the second tapered surface 49 where the inner diameter is smallest and the through hole 45 of the joint shaft 23. When the extremity of the measuring tube 12 is fitted in the circular recess 51, the through hole 45 of the joint shaft 23 and the hollow portion of the measuring tube 12 are made to communicate with each other. The one end portion 48 of the joint shaft 23 is, as described above, connected to the measuring tube 12 and the ferrule 37 with the through hole 45 and the hollow portion of the measuring tube 12 communicating with each other.

The third functional portion includes a pair of flat surfaces 52, 52 respectively disposed in sliding contact with the flat surfaces 32a and 34a of the first and second walls 26 and 27. The flat surfaces 52, 52 are formed parallel to each other along the axial line C, as shown in FIG. 2 and FIG. 5. The distance between the flat surfaces 52, 52 corresponds to the distance that allows the flat surfaces 52, 52 to movably contact the respective flat surface of the first and second walls 26 and 27. In this embodiment, the flat surfaces 52, 52 of the joint shaft 23 correspond to the "second flat surface" in the present disclosure. The contact between the flat surfaces 52, 52 and the flat surfaces 32a and 34a of the first and second walls 26 and 27 restricts the joint shaft 23 from rotating about the axial line.

The other end portion 53 of the joint shaft 23 located further outside than the fitting portion 46 in the casing 13 includes a larger-diameter portion 53a adjacent to the fitting portion 46 and a smaller-diameter portion 53b adjacent to the larger-diameter portion 53a, as shown in FIG. 5. The distal end of the smaller-diameter portion 53b sticks out of the casing 13. The smaller-diameter portion 53b penetrates through a washer 54, a spring washer 55, and a screw 56. The washer 54 and the spring washer 55 are formed in an annular plate shape. The washer 54 is located adjacent to the larger-diameter portion 53a, and the spring washer 55 is located between the washer 54 and the screw 56.

The screw 56 is formed in a ring shape. The screw 56 has a male thread 57 formed on the outer circumferential surface. The male thread 57 is fitted with the female thread 24 formed in each of the upstream cylinder 16 and the downstream cylinder 18 of the casing 13. The inner circumferential surface of the screw 56 movably receives the smaller-diameter portion 53b of the joint shaft 23, and an inner-side surface 58 is abutted against the end face of the spring washer 55 in the axial direction.

Accordingly, when the screw 56 is turned and proceeds into the upstream cylinder 16 or downstream cylinder 18, the spring washer 55 is elastically deformed by being pressed between the inner-side surface 58 of the screw 56 and the washer 54. In this embodiment, the inner-side surface 58 of the screw 56 corresponds to the "pressing portion" in the present disclosure, and the spring washer 55 corresponds to the "spring" in the present disclosure.

A joint nut 59 is thread-fitted to the distal end portion of the smaller-diameter portion 53b of the joint shaft 23. The joint nut 59 serves to fix a fluid tube 60 (see FIG. 1) to the smaller-diameter portion 53b of the joint shaft 23.

To assemble the thermal flowmeter 11 configured as above, first the sensor package 35 is assembled outside the casing 13. To assemble the sensor package 35, for example, each of the end portions of the measuring tube 12, to which the sensor 22 and the sensor wiring board 35a are attached, is passed through the holder 36. At this point, the holder 36 is oriented such that the side of the smaller hole 44 is located on the side of the center of the measuring tube 12 in the longitudinal direction. Then, the ferrule 37 is attached to each of the end portions of the measuring tube 12, and the cylindrical portion 42 of the ferrule 37 is fitted in the smaller hole 44 of the holder 36. When the ferrule 37 and the holder 36 are attached to each of the end portions of the measuring tube 12, the assembly of the sensor package 35 is finished.

Thereafter, the sensor package 35 is mounted in the casing 13. To do this, the holder 36 is fitted in each of the recessed groove 31 of the first wall 26 and the recessed groove 33 of the second wall 27 of the casing 13, by sliding the sensor package 35 in the direction orthogonal to the longitudinal direction of the measuring tube 12. After the sensor package 35 is mounted in the casing 13 as above, the joint shaft 23 is inserted in each of the upstream cylinder 16 and the downstream cylinder 18 of the casing 13. In this insertion process, the joint shaft 23 is turned about the axial line C, so as to make the pair of flat surfaces 52, 52 of the one end portion 48 of the joint shaft 23 parallel to the flat surfaces 32a and 34a of the first and second walls 26 and 27 of the casing 13.

When the joint shaft 23 is further made to proceed into the casing 13 with the flat surfaces 52, 52 abutted against the flat surfaces 32a and 34a of the first and second walls 26 and 27, the leading end portion of the joint shaft 23 is fitted in the larger hole 43 of the holder 36, and the second tapered surface 49 is fitted to the first tapered surface 41 of the ferrule 37. In addition, the extremity of the measuring tube 12 is fitted in the circular recess 51. Further, the O-ring 47 of the joint shaft 23 closely contacts the inner circumferential surface 16a and 18b of each of the upstream cylinder 16 and the downstream cylinder 18.

After the joint shaft 23 is mounted to the casing 13 as above, the washer 54, the spring washer 55, and the screw 56 are sequentially attached to the smaller-diameter portion 53b of the joint shaft 23. Then, the screw 56 is thread-fitted to the female thread 24 of each of the upstream cylinder 16 and the downstream cylinder 18. In this process, since the joint shaft 23 is restricted from rotating about the axial line by the abutment between the flat surfaces 32a and 34a of the first and second walls 26 and 27 and the flat surfaces 52, 52 of the joint shaft 23, the rotational force of the screw 56 is not transmitted to the measuring tube 12 via the joint shaft 23.

When the screw 56 is made to proceed further, the spring washer 55 is compressed by elastic deformation, and the pressing force is transmitted from the screw 56 to the joint shaft 23 via the spring washer 55 and the washer 54. When the joint shaft 23 is thus pressed toward the inner side of the casing 13, the second tapered surface 49 is pressed against the first tapered surface 41, and the first and second tapered surfaces 41 and 49 enter into close contact with each other.

At this point, since the leading end portion of the joint shaft 23 is fitted in the larger hole 43 of the holder 36, the leading end portion of the joint shaft 23 is restricted from expanding. In addition, since the ferrule 37 is supported by the first and second walls 26 and 27 of the casing 13 via the holder 36, the ferrule 37 is restricted from moving toward the inner side of the casing 13. Accordingly, when the second tapered surface 49 is pressed against the first tapered surface 41, the end portion of the ferrule 37, where the first tapered surface 41 is formed, is elastically deformed and contracts, and thus closely contacts the measuring tube 12. As result, the interface between the measuring tube 12 and the joint shaft 23 is sealed by the seal structure 50.

In the thermal flowmeter 11 configured as above, a nut for attaching the measuring tube 12 is not provided in the casing 13, which eliminates the need to secure a space for turning the nut inside the casing 13. Therefore, the casing 13 of the thermal flowmeter 11 can be formed in a reduced size.

Figure 6:
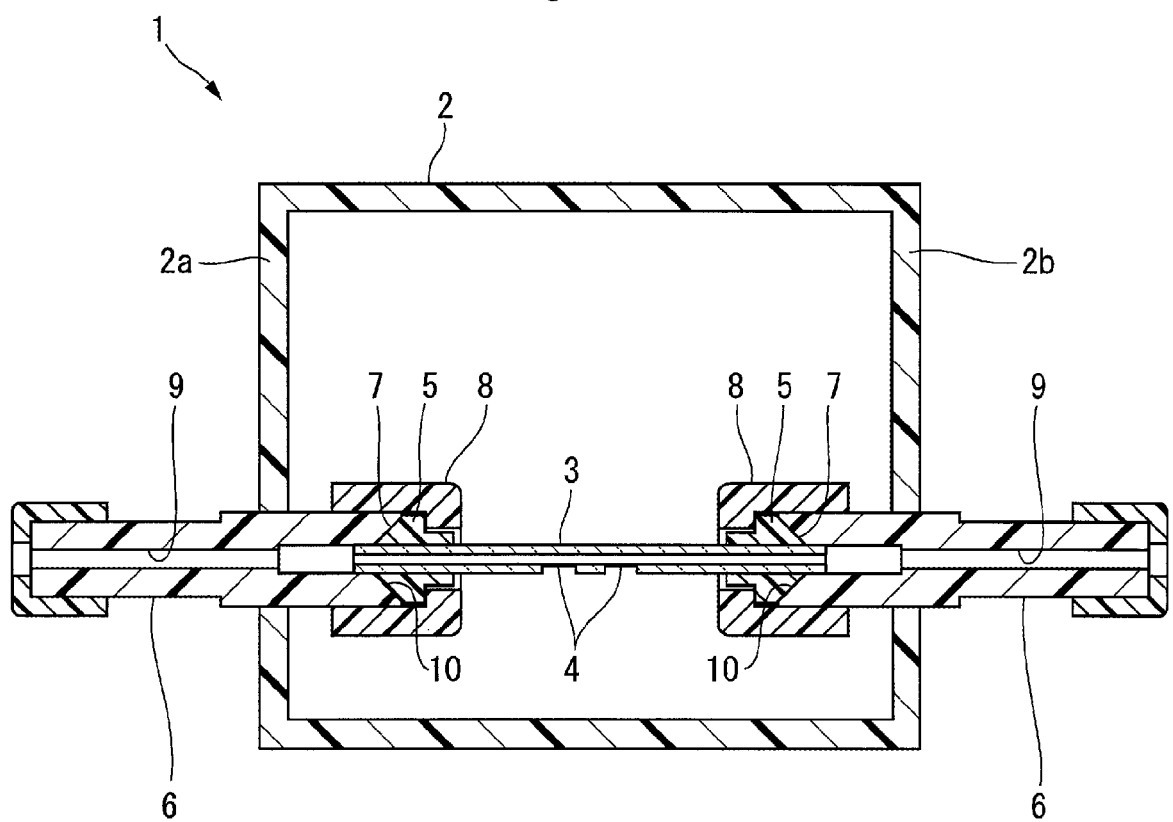
FIG. 6 is a cross-sectional view showing an existing thermal flowmeter.

In addition, in the thermal flowmeter 11, the screw 56 to be turned to attach the measuring tube 12 is provided outside the casing 13. Therefore, the thermal flowmeter 11 facilitates the mounting work of the measuring tube 12, compared with the existing thermal flowmeter shown in FIG. 6, because there is no need to turn the screw 56 inside the casing 13.

The seal structure 50 including the first tapered surface 41 of the ferrule 37 and the second tapered surface 49 of the joint shaft 23 may suffer, after a long period of use, a decline in sealing effect originating from a decrease in pressing force applied to the sealed surface (first and second tapered surfaces 41 and 49, and inner surface of the ferrule 37), because of the cold flow of the ferrule 37 and the joint shaft 23. However, with the thermal flowmeter 11 according to this embodiment, the pressing force applied to the sealed surface can be compensated by retightening the screw 56 when the components constituting the seal structure 50 (ferrule 37 and joint shaft 23) suffer the cold flow. Therefore, the sealed portion can be retightened without the need to disassemble the casing 13.

Consequently, the thermal flowmeter 11 according to this embodiment allows reduction in size of the casing 13, and yet improves the work efficiency in mounting the measuring tube 12. Further, the thermal flowmeter 11 can compensate the pressing force applied to the sealed surface.

The thermal flowmeter 11 according to this embodiment includes the spring (spring washer 55) that biases the joint shaft 23 toward the inside of the casing 13, the spring being located between the joint shaft 23 and the pressing portion (inner-side surface 58) of the screw 56. Accordingly, since the joint shaft 23 is constantly pressed by the spring force toward the inner side of the casing 13, the sealing performance can be maintained at a high level despite the cold flow taking place in the components constituting the seal structure 50 (ferrule 37 and joint shaft 23). Consequently, the thermal flowmeter 11 provides a high sealing effect for an extended period of time.

In the thermal flowmeter 11 according to this embodiment, each of the portions of the casing 13 supporting the joint shaft 23 (upstream support wall 17 and downstream support wall 19) includes the first flat surface (flat surfaces 32a and 34a) extending in the direction parallel to the imaginary axial line C passing through the one end portion and the other end portion of the casing 13. The joint shaft 23 includes the second flat surface (flat surfaces 52, 52) disposed in sliding contact with the first flat surface. Accordingly, since the joint shaft 23 is supported by the casing 13 with the first flat surface and the second flat surface abutted against each other, the rotational force transmitted from the screw 56 to the joint shaft 23 when the screw 56 is turned is received by the casing 13. Therefore, the rotational force is kept from being transmitted to the measuring tube 12 in the process of mounting the measuring tube 12 in the casing 13, and therefore the thermal flowmeter can be manufactured at a stabilized quality level without an individual difference in position of the sensor 22.

The thermal flowmeter 11 according to this embodiment includes the sensor package 35, which is mounted in the casing 13 by being made to slide in the direction orthogonal to the longitudinal direction of the measuring tube 12. Accordingly, the worker can mount the sensor package 35 in the casing 13 by holding the end portions of the measuring tube 12 with the hands, and therefore the sensor package 35 can be quickly mounted with the fine and vulnerable measuring tube 12 being protected from being broken.

The seal structure 50 according to the foregoing embodiment is configured such that the protruding portion of the ferrule 37 including the first tapered surface 41 is fitted in the recess of the joint shaft 23 including the second tapered surface 49. However, the present disclosure is not limited to such a configuration. Though not illustrated, the seal structure 50 may be composed of a recess including the second tapered surface 49 formed in the ferrule 37, and a protruding portion including the first tapered surface 41 formed on the joint shaft 23.

What is claimed is:

1. A thermal flowmeter, comprising: a casing formed in a box shape; two ferrules, each formed in a cylindrical shape, one of the ferrules being supported by one end portion of the casing and another of the ferrules being supported by another end portion of the casing along an axial line passing through the one end portion of the casing and the other end portion of the casing; a measuring tube accommodated inside the casing, and penetrating through each ferrule and fitted in a hollow portion of each ferrule of the two ferrules; a flow rate sensor configured to detect a flow rate, the flow rate sensor having a heating element and being provided in the measuring tube; two joint shafts, each including a through hole extending along the axial line, one of the joint shafts being supported by the one end portion of the casing and another of the joint shafts being supported by the other end portion of the casing to be movable along the axial line, one end portion of each joint shaft being connected to the measuring tube and to one of the ferrules, with the through hole and a hollow portion of the measuring tube communicating with each other, the other end portion of each joint shaft sticking out of the casing; and two screws, one of the screws being thread-fitted to the one end portion of the casing and another of the screws being thread-fitted to the other end portion of the casing to move along the axial line, each screw including a pressing portion pressing one of the joint shafts into an inside of the casing when the screw is fastened, wherein, for each ferrule of the two ferrules and each corresponding joint shaft of the two joint shafts, a seal structure includes a first tapered surface formed on the ferrule, and a second tapered surface formed on the joint shaft in a shape that allows the second tapered surface to fit the first tapered surface, and is provided on an interface between the ferrule and the joint shaft, and the ferrule is tapered to be smaller towards the corresponding joint shaft so that the seal structure is formed when the pressing portion of the corresponding screw presses the joint shaft.

2. The thermal flowmeter according to claim 1, further comprising, for each joint shaft of the two joint shafts and each corresponding screw of the two screws, a spring that biases the joint shaft toward the inside of the casing, the spring being located between the joint shaft and the pressing portion of the screw.

3. The thermal flowmeter according to claim 1, wherein, for each joint shaft of the two joint shafts, a portion of the casing supporting the joint shaft includes a first flat surface extending in a direction parallel to the axial line, and the joint shaft includes a second flat surface disposed in sliding contact with the first flat surface.

4. The thermal flowmeter of claim 1, further comprising an upstream support wall structure that accommodates a holder that holds one ferrule of the two females, without applying force on the one female along the axial line.

5. The thermal flowmeter of claim 1, wherein the measuring tube is not supported at any point along the axial line between the two ferrules.

* * * * *